UNITED STATES PATENT OFFICE.

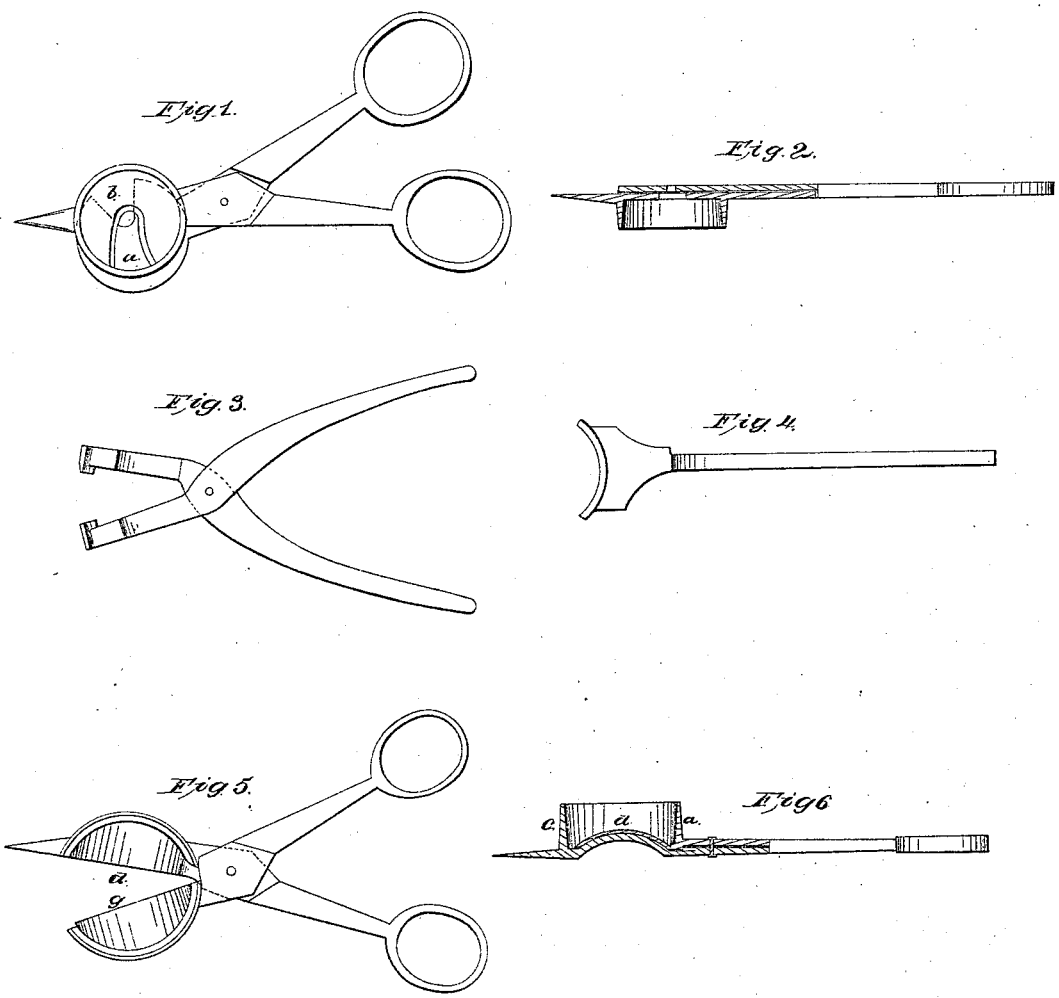

ROBERT NELSON EAGLE, OF NEW YORK, N. Y.

IMPROVEMENT IN SNUFFERS FOR LAMPS.

Specification forming part of Letters Patent No. 36,590, dated September 30, 1862.

*To all whom it may concern:*

Be it known that I, ROBERT N. EAGLE, of the city, county, and State of New York, have invented new and useful Improvements in Snuffers or Snuffing-Shears for Lamps; and I do hereby declare that the following is a full and clear description of their construction and operation, reference being had to the annexed drawings, making part of this specification, in which—

Figure 1 is a bottom view of my invention, wherein *a* represents the indentation in one blade, and *b* the corresponding one in the other blade; and Fig. 2 is a sectional view of the same. Fig. 3 is a side view of another modification of my invention, and Fig. 4 a sectional view of the same. Fig. 5 is a top view, and Fig. 6 a sectional view, of another modification of my invention, wherein C represents the gallery or raised rim, and *d* and *g* its cutting-edges.

The improvement applies to any lamp in use, or that may be brought into use, having chimneys or not, and burning flat or round wick, whether the wick is to be trimmed over a convex or concave tube or surface; and it consists in making the blades either concave (as represented in one modification of the same in Fig. 6) or convex, closing upon the exact edge of each other, or passing one above the other, or the sharp edge of one blade cutting against a flat surface on the other blade, as shown in Fig. 3, or an indentation in one or both blades, as shown in Fig. 1, which, when open, encircles the wick, and in closing compresses and cuts it evenly, as will be better understood by reference to the drawings.

The handles of the snuffers I propose to construct (where handles are used) will be in the direction of or nearly parallel to the blades, as shown in Figs. 1 and 5, or at right angles with or nearly perpendicular thereto, as shown in Figs. 3 and 4, or in any other desired relation therewith for convenience in use, said snuffers or snuffing-shears being furnished with a partial or circular raised rim or gallery, as a box or receptacle for catching the burned wick removed by the operation, as more clearly shown in Figs. 2 and 6.

A modification of the snuffers is to make part of the blades straight, as in the present scissors, for cutting and giving desired shapes to new wick, said straight part of blades being placed either between the rivet and snuffer-box or beyond the box and nearer the point of the snuffers.

What I claim as new is—

1. The making of the blades of snuffers or snuffing-shears for lamps constructed with chimneys or without, and burning flat or round wick, either concave or convex to meet the convexity or concavity of the burner or tube holding the wick.

2. So constructing lamp-snuffers for trimming the round wick that the indentation in one or both blades, when the latter are opened, admits the wick, and in closing encircles and compresses it, and accomplishes the work in a single and even cut, in the manner described.

3. Making snuffers or snuffing-shears for lamps with one part of the blades straight and another part concave or convex, for the purposes set forth.

4. A partial gallery or a circular raised rim for catching the crust or burned part of the wick when removed.

R. N. EAGLE.

Witnesses:
EDM. F. BROWN,
H. MILLER.